A. SHERWOOD.
WHEEL.
APPLICATION FILED DEC. 7, 1911.
1,092,227.
Patented Apr. 7, 1914.
2 SHEETS—SHEET 1.
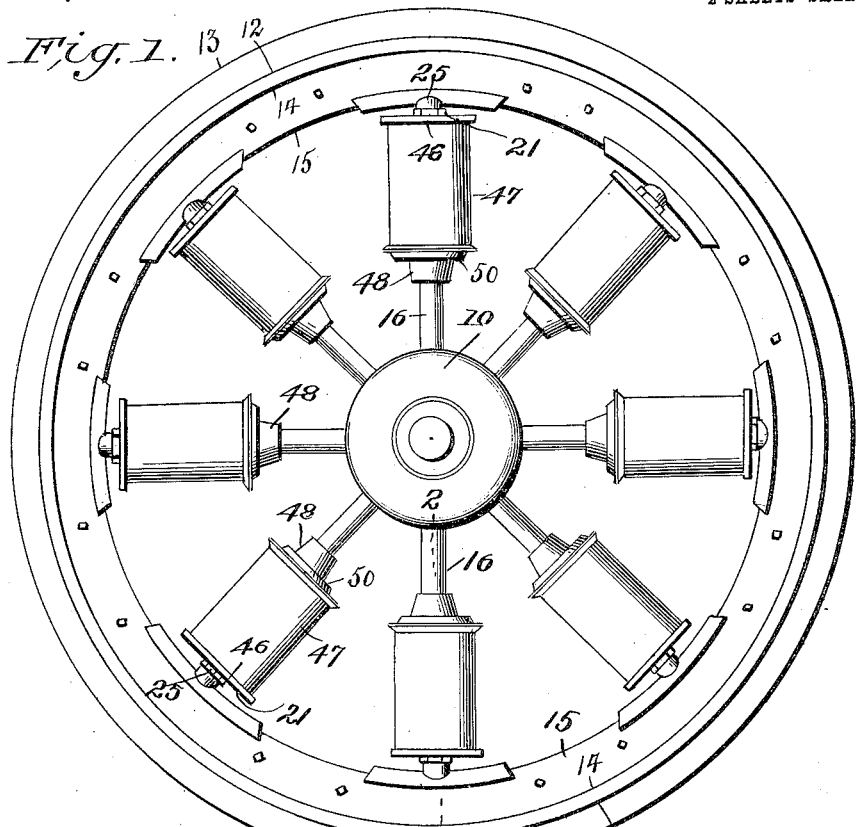
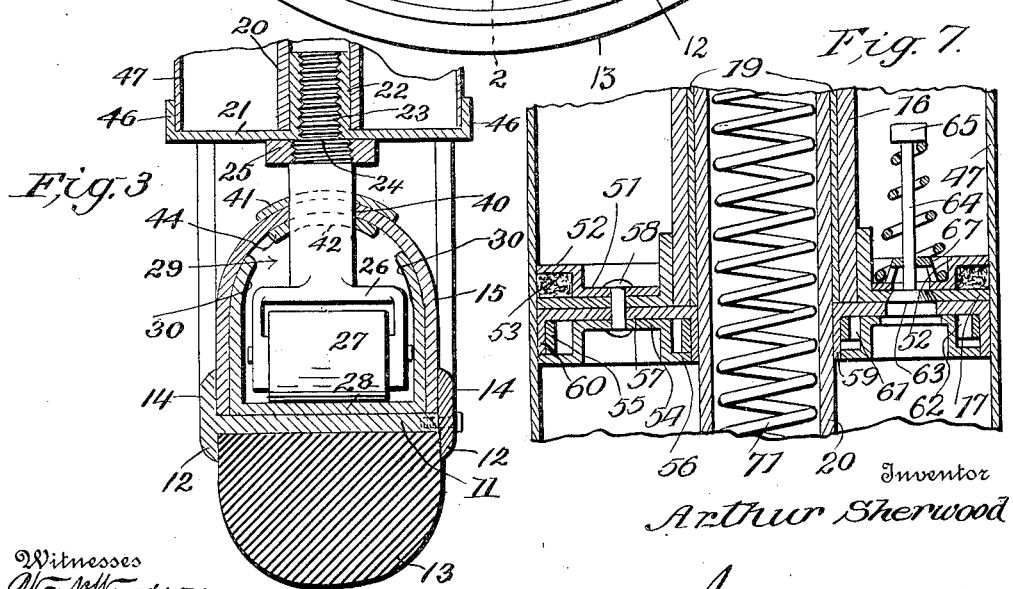
Inventor
Arthur Sherwood
By
A. R. Lacey,
Attorney
Witnesses
W. N. Woodson
G. G. Watt

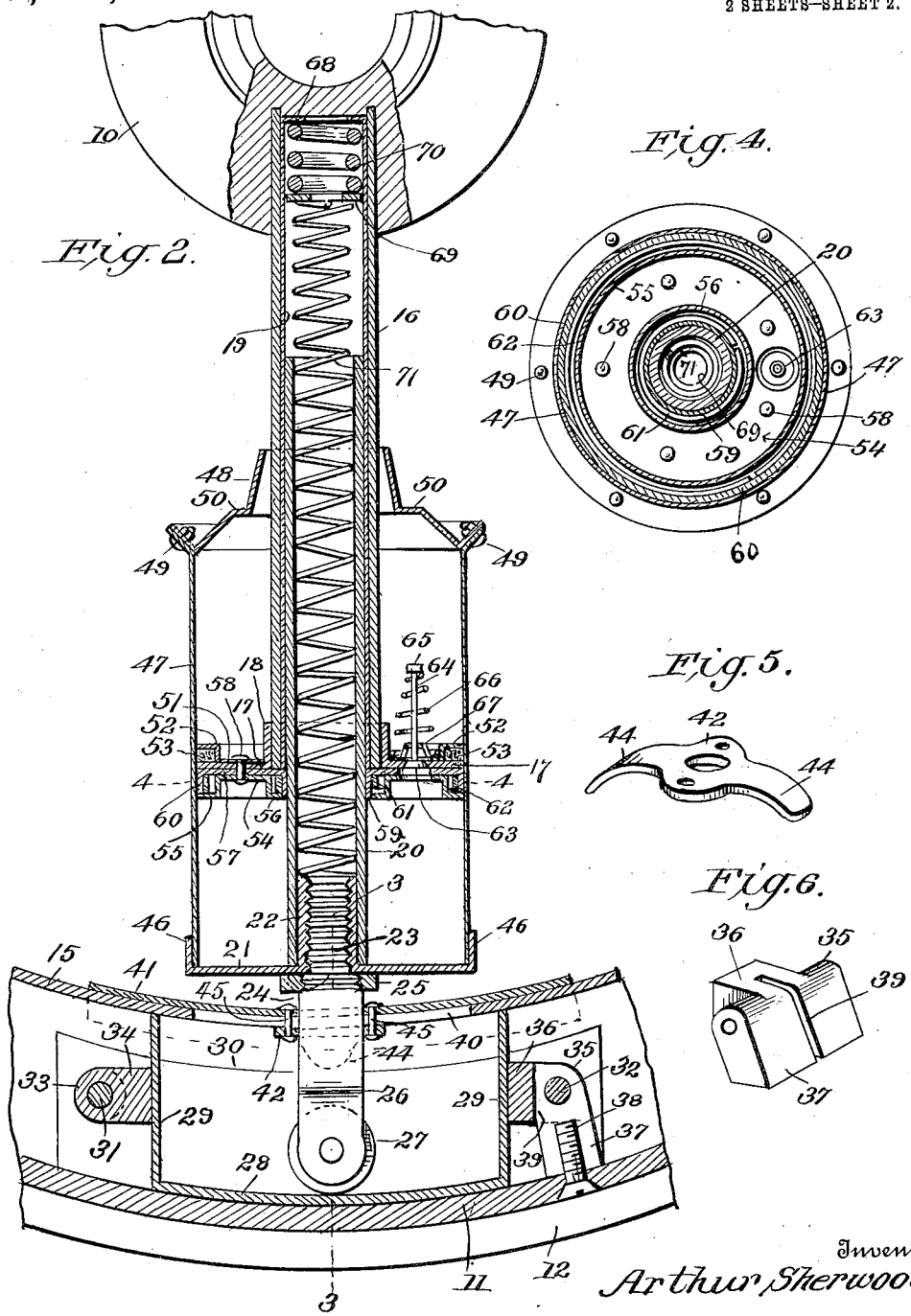

UNITED STATES PATENT OFFICE.

ARTHUR SHERWOOD, OF NEW HAVEN, CONNECTICUT.

WHEEL.

1,092,227.　　　Specification of Letters Patent.　　Patented Apr. 7, 1914.

Application filed December 7, 1911.　Serial No. 664,395.

*To all whom it may concern:*

Be it known that I, ARTHUR SHERWOOD, citizen of the United States, residing at New Haven, in the county of New Haven and State of Connecticut, have invented certain new and useful Improvements in Wheels, of which the following is a specification.

This invention relates to improvements in yieldable spokes for vehicle wheels, more particularly to wheels for automobiles and like vehicles, and has for one of its objects to improve the construction and increase the efficiency and utility of devices of this character.

Another object of the invention is to provide a wheel having yieldable spokes of improved construction and increased efficiency and utility whereby the requisite yieldable action of the wheel rim is secured without the necessity for employing the fragile pneumatic tire structures.

Another object of the invention is to provide a device wherein the natural elasticity of air under pressure is utilized to produce the cushioning effect of the wheel.

With these and other objects in view, the invention consists in certain novel features of construction as hereinafter shown and described, and then specifically pointed out in the claims, and in the drawings illustrative of the preferred embodiment of the invention.

Figure 1 is a side elevation of a wheel constructed in accordance with the invention; Fig. 2 is a vertical section enlarged through one of the flexible spoke devices and through the tire and a portion of the head; Fig. 3 is a section on the line 3—3 of Fig. 2; Fig. 4 is a transverse section on the line 4—4 of Fig. 2; Fig. 5 is a detached perspective view of one of the clamping members; Fig. 6 is a detached perspective view of one of the spacer members; Fig. 7 is an enlarged sectional detail illustrating the construction of the piston and its valve.

Corresponding and like parts are referred to in the following description and indicated in all the views of the drawings by the same reference characters.

The improved wheel comprises a hub represented as a whole at 10 and of any suitable construction. When the improved device is applied to automobile wheels, the hub will be of the usual form employed in automobiles, and a conventional hub of this character is represented for the purpose of illustration.

The rim of the improved wheel is represented conventionally at 11, and is provided with outwardly directed flanges 12 to support a tire preferably of hard rubber and represented at 13. The rim 11 is also provided with inwardly directed flanges 14 to support a U-shaped " felly " member 15 preferably of plate metal bent into the required shape and supported by its outer edges between the flanges 14. The rim 11 together with its flanges 14, is secured in any suitable manner to the felly portion 15. Any required number of the spokes may be employed, but for the purpose of illustration eight are shown, and as the spokes are precisely alike, the description of one will suffice for all.

Each spoke comprises an outer tubular member or shell 16, rigidly secured at its inner end in the hub 10 and terminating at its outer end some distance short of the inner surface of the felly member 15. Located at the outer end of each of the spoke members 16, is a disk 17 having a lateral flange 18 bearing around the spoke member 16, and rigidly secured thereto in any suitable manner. Each of the spoke members 16 is provided with an internal bushing 19 of relatively soft metal, and slidably disposed within each of the bushing members is an inner shell or spoke member 20. Located at the outer end of the inner spoke member 20 is another disk 21 having a lateral flange 22 projecting into the outer end of the spoke member 20 and rigidly secured thereto by any suitable means. The flange 22 is internally threaded, and fitting within this threaded portion is a stud 23. Each of the studs is enlarged at its outer end to form a lateral shoulder 24 to bear against the outer face of the disk 21, and the enlargement of the stud is externally threaded to receive a clamp nut 25 bearing against the outer face of the disk 21. The nut 25 thus serves as a jam-nut to lock the disk in engagement with the stud. The stud extends beyond the shoulder and is provided with forked arms 26 to receive a bearing roller 27.

The forked portion 26 of the stud together with the bearing roller 27, extends into the felly member 15 of the wheel, and located within the felly member opposite each spoke, is a plate 28 which bears against the inner face of the rim 11, and with inwardly directed ends 29 and sides 30. The sides 30 bear against the inner faces of the felly member 15 and extend for a portion of the distance only of the felly, while the ends 29 are extended and bear against the hollow inner face of the felly member, as shown. The plates 28 together with their ends 29 and sides 30, form box-like devices which are supported within the felly member opposite each spoke. The sides 30 extend beyond the ends 29 and are perforated to receive holding bolts 31—32 which extend through the sides and likewise through the felly members. Surrounding the bolt 31 and extending between the sides 30, is a spacer member 33 having a projection 34 bearing against the adjacent end 29, while the pin 32 is provided with a similar spacer member 35 having a projection 36 bearing against the adjacent end 29. The spacer member 35 is also provided with an obliquely extending projection 37 which bears against the inner face of the adjacent portion of the rim 11 and is secured thereto by a clamp screw 38. The spacer member 35 is also provided intermediate its ends with a transverse cleft 39 which enables the two parts of the felly member and the sides 30 to be compressed to increase the grip between the parts.

At the point where the stud 23 passes into the felly member, the latter is slotted longitudinally as shown at 40, and fitting over the inner face of the felly member 15 and covering the slot is a plate 41 curved to correspond to the curvature of the felly member. The outer face of the cover plate 41 extends beneath the jam-nut 25, and bearing around the stud 23, inside of the felly member 15, is an annular clamp member 42 having laterally extending side portions 44 curved to correspond to the inner face of the felly member 15 and extending transversely of the same. The annular clamp member 42 is connected to the cover plate 41 by rivets 45 or other suitable fastening devices which extend through the slot 40. By this means the cover plate 41 is coupled to the felly member and loosely engaged with the stud 23 and is slidable therewith within the range of the slot 40. The slot 40 is slightly less in length than the space between the end members 29 so that the bearing roller 27 may move longitudinally of the felly member to an extent equal to the length of the slot.

At its outer edge the disk 21 is provided with an inwardly directed flange 46, and supported upon this flange is a barrel or shell 47 in which the disk 17 is movably disposed. At its inner end the barrel 47 is provided with a closure 48 riveted or otherwise secured thereto as shown at 49. The closure 48 is generally conical in outline and formed with a portion 50 extending at right angles to the axial line of the spoke, the object to be hereafter explained.

Bearing upon the disk 17 at one side is a plate 51 having a flange 52 at its outer end to form a housing or support for an annular packing member 53 of felt or like material which bears against the inner face of the shell or barrel 47 and prevents the passage of dust or dirt. Bearing against the outer face of the disk 17 is another annular plate 54 having annular flanges or housings 56—55 at its inner and outer edges. Located between the disk 17 and plate 54, is a packing member 57 of leather, rubber or the like material, the four members 17, 51, 54 and 57 being united at suitable intervals by rivets or other fastening devices 58. At its inner edge the packing member 57 is turned into an outwardly directed flange 59 which bears against the outer face of the inner spoke member 20, and likewise provided with an outwardly directed flange 60 at its outer edge which bears against the inner face of the barrel 47.

Surrounding the inner spoke member 20, and bearing against the flange 59 of the packing member, is an annular holding spring 61, while a similar annular holding spring 62 bears against the inner face of the outer flange 60 of the packing member. The housing 55 covers and maintains the packing spring 62 in position, while the housing flange 56 covers and maintains the holding member 61 in position. By this means an effectual piston is produced having an efficient packing member to prevent the escape of air between the barrel 47 and the piston and likewise between the inner spoke member 20 and the piston, while at the same time the supplemental or auxiliary packing 53 increases the efficiency of the device and effectually prevents the escape of air between the piston and the barrel. At one point the disk 17 is formed with an aperture and the sides of the aperture formed annular or conical to form a valve seat upon which a valve 63 is seated. The valve is provided with a relatively long stem 64 which projects toward the closure 48 of the barrel and is provided with an enlarged head 65 with which the right-angled bearing face 50 of the closure is adapted to engage when the piston is moved to a sufficient extent within the barrel and thus open the valve. Surrounding the stem 64 is a spring 66 operating to maintain the valve yieldably seated.

Rising from the disk 51, is a guard 67 which surrounds the stem 64 and prevents lateral displacement of the latter during its movement.

At its inner end the bushing 19 is provided with an inwardly directed flange 68, and slidably disposed within the bushing is a spacer ring 69. Located between the flange 68 and the ring 69 is a relatively heavy coil spring 70, while a lighter coil spring 71 is located within the spoke members and bears at one end against the ring 69 and at the other end upon the flange 22 of the plate 21. By this means the spring 71 exerts its force to maintain the two spoke members 16—20 in distended position, while the heavier spring 70 comes into action in event of the reduction of pressure being developed in event of leakage or from other causes, and thus equalize the action. By this arrangement it will be obvious that a wheel having yieldable spokes is produced, the spokes yielding under the pressure imparted by weight applied to the vehicle, which will yield in substantially the same manner as the ordinary pneumatic tire, but without danger of puncture or displacement of the parts in event of the fracture or impairment of the tire. The relatively soft bushing member 19 receives the wear and friction and thus prevents the impairment of the members 16—20. When the bushing 19 becomes worn and impaired it can be easily and cheaply renewed and without the necessity for discarding the more expensive portions of the tire.

With the device thus constructed, when no weight is placed upon the wheels, the hub 10 remains at the center of the felly and rim member, but when weight is applied to the wheel the center or hub portion is moved downwardly, which movement causes the spoke member 16 to carry the piston against the air contained in the lower or outer portion of the barrel 47, and thus compresses the air and produces the requisite cushioning effect. By this means an efficient and yieldable resistance is produced.

When the inner spoke member 16, which, for the time being is located uppermost, is depressed far enough, the terminal 65 of the stem 64 of the valve 63 engages the inwardly directed portion 50 of the cylindrical barrel and opens the valve and thus destroys the partial vacuum which has been formed in the cylinder, and the valve is thereby held in open position temporarily to provide free exit and entrance of the air to the cylinder.

Having thus described the invention, what is claimed as new is:

1. A wheel including a hub and a hollow rim having a plurality of longitudinal slots, a plurality of spokes extending from said hub and into the hollow rim and through the slots, a covering member for each slot and through which the spokes are slidably disposed, said covering members being arranged externally of the rim and covering and protecting the slots, a clamp member for each covering member within the rim and through which the spokes respectively extend, each of said clamp members having lateral wings bearing against the inner face of the rim, and fastening means connected to the covering member and to the clamp member and extending through the slots.

2. A resilient wheel including a rim and a hub, spokes each formed of an outer tubular member and an inner tubular member telescopically engaging and connected respectively to the rim and to the hub, a cylindrical barrel connected to move with the inner spoke member and extended over the outer spoke member, a plunger carried by the outer spoke member and operating in the barrel, a valve in said plunger, and a member extending into position to be engaged by the cylinder to open said valve when the plunger is moved into an abnormal position.

3. A resilient wheel including a rim and hub, spokes each formed of a plurality of members telescopically engaging, one of the members of each spoke being connected to the hub and each of the other spoke members movably engaging the rim, a cylindrical barrel carried by one of the spoke members, a plunger carried by the other spoke member and operating in the cylindrical barrel, a valve in said plunger, and a member extending into position to be engaged by the barrel for opening said valve when the plunger is moved into an abnormal position.

4. A resilient wheel including a rim and hub, spokes each formed of a plurality of members telescopically engaging, one of the members of each spoke being connected to the hub and each of the other members of each spoke movably engaging the rim, a cylindrical barrel carried by one of the spoke members, a disk carried by the other spoke member and operating in said barrel, an annular packing member carried by said disk and with outwardly directed flanges engaging respectively against the barrel and the rim-engaging spoke member, annular split springs bearing respectively against said flanges, and a plate connected to said packing member and provided with annular guard flanges bearing over said annular springs.

5. A resilient wheel including a rim and hub, spokes each formed of a plurality of members telescopically engaging, one of the members of each spoke being connected to the hub and an outer member of each spoke movably engaging the rim, a cylindrical barrel carried by one of the spoke members, a disk carried by the other spoke member and operating in said barrel, an annular packing member carried by said disk and with outwardly directed flanges engaging respectively against the barrel and the rim-engaging spoke member, annular split springs bearing respectively against said flanges, a plate connected to said packing member and provided with annular guard flanges bearing over said annular springs, another plate bearing upon said disk and provided with an annular flange, and an annular packing member within said last-mentioned flange and bearing against said barrel.

In testimony whereof I affix my signature in presence of two witnesses.

ARTHUR SHERWOOD. [L. S.]

Witnesses:
L. L. BRADLEY,
J. I. CROTTY.

Copies of this patent may be obtained for five cents each, by addressing the "Commissioner of Patents, Washington, D. C."